March 30, 1965     F. CREMER     3,176,059
METHOD AND APPARATUS FOR STRIPPING ARTICLES FROM FORMS
Filed March 10, 1961     2 Sheets-Sheet 1
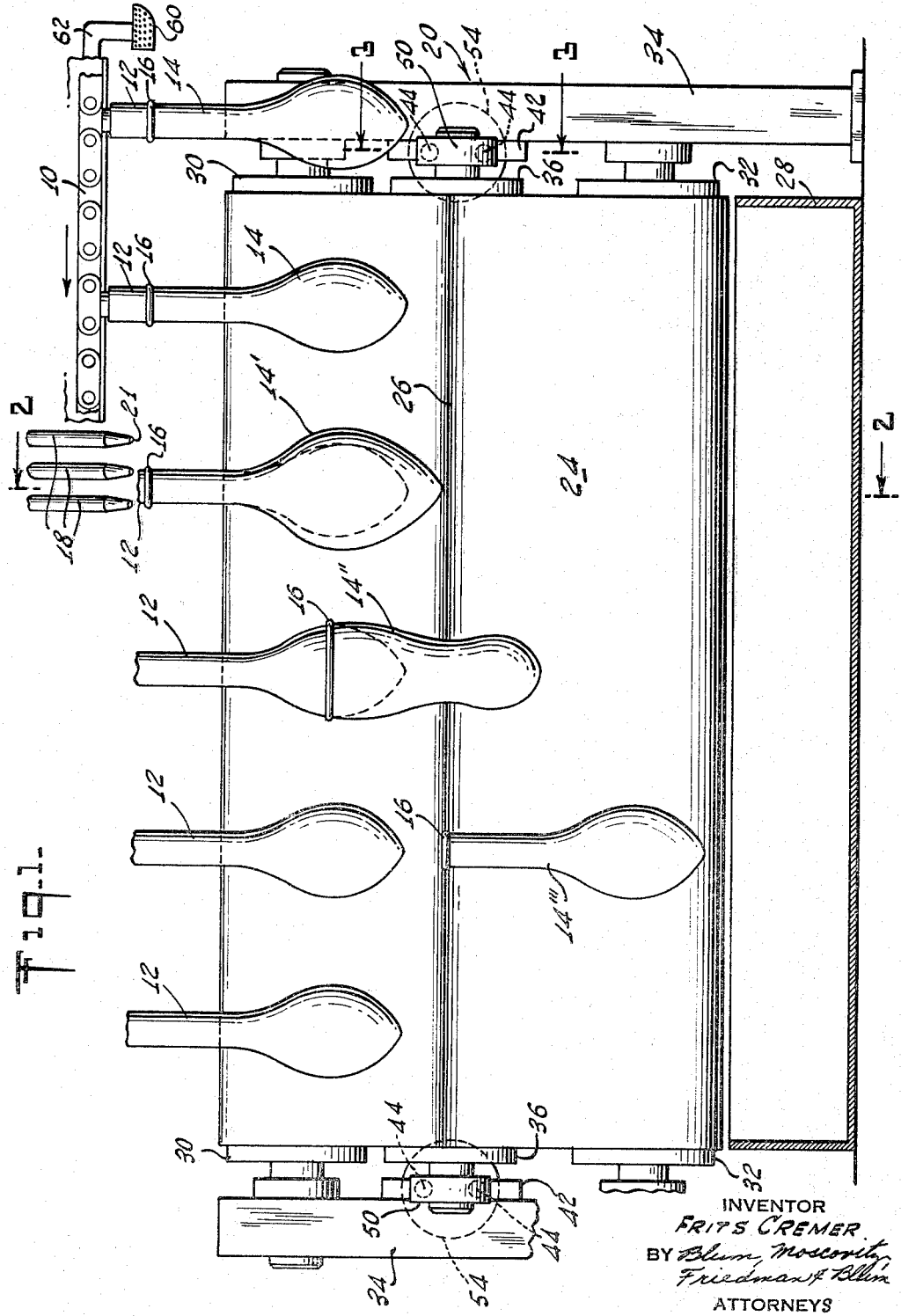
INVENTOR
FRITS CREMER
BY
ATTORNEYS March 30, 1965 F. CREMER 3,176,059
METHOD AND APPARATUS FOR STRIPPING ARTICLES FROM FORMS
Filed March 10, 1961 2 Sheets-Sheet 2
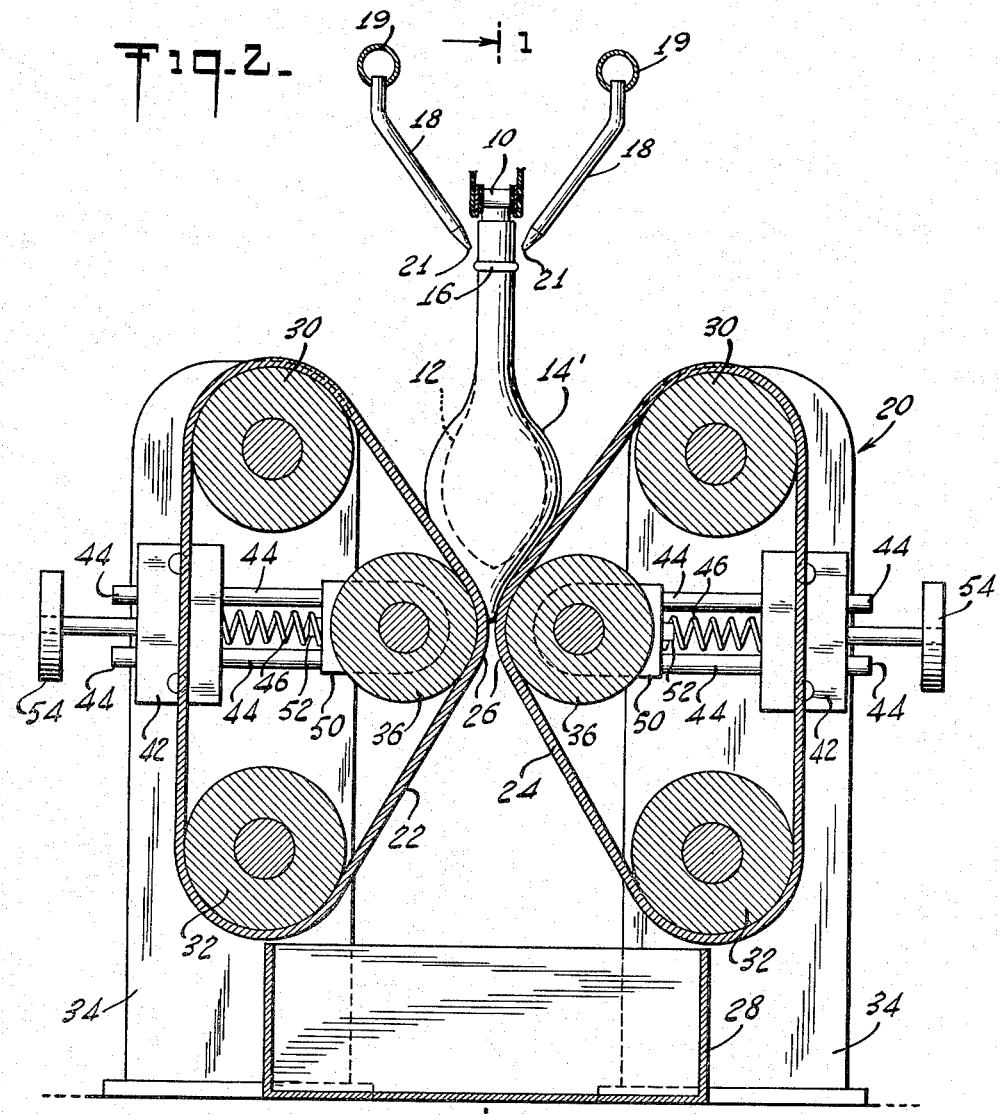
INVENTOR
FRITS CREMER
BY Blum, Moscovitz,
Friedman & Blum
ATTORNEYS United States Patent Office 3,176,059
Patented Mar. 30, 1965

3,176,059
METHOD AND APPARATUS FOR STRIPPING ARTICLES FROM FORMS
Frits Cremer, New York, N.Y., assignor, by mesne assignments, to Oak Rubber Company, Ravenna, Ohio, a corporation of Ohio
Filed Mar. 10, 1961, Ser. No. 94,903
9 Claims. (Cl. 264—335)

This invention relates generally to improvements in the manufacture of articles of stretchable material, and more particularly, to improvements in method and apparatus for automatically stripping or detaching articles of stretchable material from their forms.

As is well known, articles of stretchable material, such as balloons, may comprise rubber or other elastomeric material. In the process of manufacturing articles of stretchable material, a form is used having a shape corresponding to the article to be formed and the rubber or other elastomeric material is deposited onto the form in a manner well known to those skilled in the art. A problem heretofore unsolved arises with respect to automatic removal or stripping of the stretchable article from its form. The neck portion of the article is usually of reduced size compared to the main body portion of the article, and the neck portion at its opening is usually provided with a rim or bead portion, this construction requiring the portions of reduced size to be stretched over the form for removal therefrom. This removal operation must be carefully performed to avoid damage to the articles and has proved to be a difficult one in the industry, and in addition to manual removal, other apparatus and techniques have been proposed, but the problem of automatic mass stripping remained heretofore.

Heretofore a number of proposals were made to achieve automatic stripping of the articles from their forms but none of such proposals have proved satisfactory in operation.

It is therefore the primary aim and object of the present invention to provide improved method and apparatus for automatically stripping or removing the articles from their forms which has proved to be foolproof and practical for the low cost mass production of such articles, and overcomes the inherent deficiencies of the prior art proposals.

Pursuant to this object of the present invention, the method and apparatus for removing articles from the forms is operative with a minimum of pressure without danger of damage to the articles.

The invention will be described specifically with respect to balloons, but it will be obvious that the invention is not limited thereto and is applicable to other thin-walled rubber of elastomeric articles having various outer configurations to form a toy device, or otherwise.

In accordance with the present invention, provision is made for the use of a companion pair of cooperating endless belts in order to strip or remove the balloon from its form at a stripping station. After the formation of the balloon pursuant to any of the well known techniques, the balloon must be stripped from its form or mandrel and the present invention is directed to improved methods and apparatus for continuously stripping balloons from their forms at such stripping station. The apparatus includes a pair of endless belts, oppositely driven, which are arranged so that the nip of the belts will be substantially in engagement and the belts will advance in unison. The balloon is inflated and brought into engagement between and with the pair of endless belts which advance the balloon therewith so as to strip the balloon from the form. A plurality of nozzles (although a single one may also be used) is disposed adjacent to the form in proximity to the bead or rim of the balloon so that a blast or jet of air is operative to expand the balloon into engagement between the belts above the nip thereof.

This air inflation of the balloon preliminary to the stripping thereof from the form performs the two-fold function of providing an air impervious test for the balloon while at the same time causing opposed surfaces thereof to engage the belts just above the nip thereof. Thus the air inflation step is effective to pressurize the balloon into engagement with the belts. The movement of the belts with a portion of the inflated balloon in engagement therewith is effective to expand the bead and neck of the balloon over the form to strip the balloon herefrom as will be detailed hereinafter.

Yet another object of the present invention is the provision of an improved balloon stripping station and technisue of simple design and construction, economical to manufacture, and highly efficient in the accomplishment of their intended purposes.

Other objects, features and advantages of the present invention will be more fully understood from the following description of the preferred embodiment of the invention, shown, by way of example, in the accompanying drawings, in which:

FIG. 1 is a front elevational view of the apparatus of the present invention, shown partly in section, and taken on the line 1—1 of FIG. 2;

FIG. 2 is a side elevational view, shown partly in section, and taken on line 2—2 of FIG. 1; and FIG. 3 is a detail sectional view, taken on the line 3—3 of FIG. 1, and illustrating the means to adjust the belt spacing at the nip portion thereof.

Referring now more particularly to FIGS. 1 and 2 of the drawings, the apparatus of the present invention includes an endless conveyor mechanism 10 of basically conventional type adapted to support a plurality of forms or mandrels 12 on which a stretchable, elastomeric or other balloon article 14 is formed by any well known process. The balloons are formed at a forming station (not shown) and subsequent to the various well known stages of formation the balloons are stripped from their forms at the stripping station S shown in the drawings and forming the subject matter of the present invention. The station S, which is the final stage of the series of balloon manufacturing stations, receives the balloons to be stripped by the traveling conveyor 10.

Positioned adjacent to the conveyor mechanism 10, along the path of travel thereof, and above the mouth of the article 14 at the bead or rim 16 thereof are series of nozzles or jets 18 for injecting compressed air into the body of the balloons portion for inflation thereof as indicated by the reference numeral 14'. The nozzles 18 depend from an adjacent compressed air manifold 19 and have outlet fittings 21 disposed to direct a compressed air blast on the upper surfaces of the form above the bead 16 of the balloons as the form travels between the nozzles (see FIG. 2). The conveyor mechanism moves the article beneath the nozzles 18. While air has been mentioned as the inflating medium, it is understood that any other suitable fluid may be used.

When the article is inflated while on the form prior to the stripping thereof with the apparatus of the present invention, defective articles will be readily detected since the article will not be inflatable if there is a perforation therein or the article will explode if there is a weak spot therein. Thus the balloon will not inflate if defective as aforenoted. The degree of inflation to expand the article the requisite amount is dependent upon the strength factors of the article and the shape thereof such as the tensile stress of the body of the article, the thickness of the article, the amount the bead or rim must be stretched, etc. Accordingly, it is possible to test the article and thus determine its quality prior to removal thereof from the form.

The longitudinal axis of each of the forms 12 is substantially perpendicular to the direction of travel of the conveyor mechanism, as indicated by the arrows in FIG. 1, and the axes of the nozzles preferably form an acute angle with the longitudinal axes of the forms 12 as shown. While nozzles 18 are shown as disposed on opposite sides of the conveyor mechanism 10, it is possible to dispose the nozzles on one side of the conveyor mechanism or in any other suitable manner in order to meet particular installation requirements.

Positioned below the conveyor mechanism 10 is a stripping mechanism generally designated by reference numeral 20. The stripping mechanism 20 which is disposed at stripping station S includes a pair of oppositely disposed and oppositely rotating endless friction belts 22 and 24, there being defined between the belts a nip portion 26. The two belts 22 and 24 may be formed of any suitable friction material or may have a serrated surface in order to effect a gripping action on the portions of the inflated balloon in engagement therewith. The belts at nip 26 are normally biased into engagement and move downwardly in unison in a direction parallel to the longitudinal axes of the forms and in a direction transverse to the path of travel of the conveyor mechanism. It is to be noted that the articles 14 are stripped from the forms 12 by means of the combined forces applied resulting from the vertical downward movement of the belts and the forward horizontal movement of the forms carried by the conveyor mechanism. The article 14 preliminary to inflation passes between the upper runs of the two belts which form an included acute angle therebetween as viewed in FIG. 2 and is then brought to the inflation zone beneath the nozzles 18. At this zone, the article is inflated until the body portion thereof reaches a size as indicated by the reference numeral 14' whereby to cause oppositely disposed lower surface portions of the article to be brought into engagement with the belts. The conjoint movement of the conveyor mechanism 10 together with the forms 12 in horizontal direction and of the two oppositely rotating belts moving in unison in a vertical direction is effective to slide the article down the form 12 to a position as indicated by the reference numeral 14" at which position the bead or rim portion has been stretched to its maximum. It will be evident that should the article be perforated or burst, the belts 22 and 24 will not strip the article.

It is also within the scope of this invention to have certain nozzles inflate the article for purposes of testing and to have other nozzles supply additional pressure to inflate the article so as to bring it into surface engagement with the belts.

It will be apparent that the balloon is inflated into surface-to-surface engagement with the belts with a cushion of air disposed between the form and belts to maintain the requisite surface-to-surface engagement while the concomitant movement of the belts and conveyor advances the balloon between the nip of the belts until stripping is accomplished as indicated at 14'''. As the lower body portion of the balloon is pulled between the nip of the belts, the fluid medium in the article is forced upwardly and assists in widening the upper portion to facilitate and assist the belts in the downward pulling action thereof. After the top part of the article has become inflated, which occurs when a portion of the bottom portion of the article has passed between nip portion 26 of the belts, the enlarged portion of the form is surrounded by the bead 16. The fluid pressure will lift the bead from the form sufficiently to allow a thin film of air to pass under the bead, and when this takes place the finished article 14''' is ejected from the form and released by the belts into a receptacle or container 28 positioned beneath the belts. Each belt is carried by a pair of rollers or rotating members 30 and 32 mounted for rotation in suitable bearings, but restrained against axial movement. A pair of spaced lateral supports 34 are provided to mount the bearings for the rotatable members and thereby also support the belts in proper spaced relationship to each other and the conveyor mechanism. A third roller or rotating member 36 is provided to define the nip and adjust the biasing pressure between the two belts thereat. Where three rollers are used to carry each belt as in the illustrated embodiment, the third roller 36 is positioned between the two rollers and biases the belt towards the opposite one. Where the lower roller 32 is omitted, which is within the scope of the present invention, the roller 36 performs the functions of a second roller for its companion belt in addition to regulating the biasing force between belts at the nip portion. Belt 22 is rotated clockwise by one set of rollers whereas belt 24 is rotated counterclockwise by the other set of rollers. The two belts move in unison to perform a mangle-type movement at the nip portion 26. One or more of the rollers of each set of rollers may be power driven in any suitable manner.

Referring now more particularly to FIGS. 2 and 3, a lockable spring bias means 40 for each roller 36 is provided and includes a guideway 42 fixed in position, by any suitable means, to a companion support 34 and having an opening or transverse bore 43 the axis of which is transverse to the longitudinal axes of the forms 12. Also forming part of the lockable spring bias means are a pair of guide rails 44 slidably mounted in tracks 45 of guideway 42. Positioned between the rails 44 is a tension spring 46 having one end thereof in engagement with a rotatable adjusting screw or member 48 positioned for rotation within the transverse bore 43 in the guideway 42.

Each roller 36 is free to rotate in a spring tensioned bearing block 50 and is movable transversely therewith with respect to the longitudinal axes of the forms. Bearing block 50 is provided with a projecting lug 52 which is engaged in and guides the other end of the tension spring 46, said block being fixed to rails 44 for conjoint movement therewith. In order to adjust the biasing pressure between the two belts at the nip portion 26, member 48 may be rotated by means of an adjusting knob 54 coupled thereto, the latter being operative to vary the tension of the spring and the force exerted thereby on the bearing block 50. When knob 54 is rotated to compress the spring 46, the rails 44 and block 50 move towards the forms to increase the biasing pressure at the nip portion of the belts. Conversely the knob 54 is rotated in an opposite direction to decrease the tension on the spring and thereby decrease the biasing pressure between the belts at the nip portion.

Accordingly, rollers 36 are yieldably mounted through springs 46 and are adjustably yieldable transversely of the longitudinal axis of the forms and in the preferred embodiment are disposed in parallelism to the plane of movement of the conveyor mechanism.

If desired, in advance of the stripping station there may be provided a brush 60, or the like, mounted on a stationary support 62 to "break the bead" 16 of the balloon and thereby facilitate the air inflation step. Frequently the bead sticks to the form and by using a brush 60, which is positioned to engage the bead on one side as the balloon travels therepast, the bead is released from sticking engagement to the form whereby the balloon may be readily inflated at the stripping station by nozzles 18.

It will be understood that the speed of the belts may be decreased while the speed of the conveyor mechanism is increased to achieve the desired stripping action, and vice versa, the stripping operation being dependent on both conveyor speed and belt speed.

Thus the present invention may be used to both test and strip the articles from the forms. The included acute angle between the belts may be varied in accordance with the article to be stripped as will be understood. It will be understood that any suitable adjustment means may be incorporated in the aforedescribed mechanism to adapt the same for stripping balloons of a range of sizes from their forms.

While there has been illustrated and described what is presently considered to be the preferred embodiment of this invention, it will be obvious to those skilled in the art that various changes and modifications may be made therein without departing from the spirit and scope of the invention.

What I claim as new and desire to secure by Letters Patent is:

1. A method of stripping an article of thin stretchable material from the form on which it is made which comprises introducing fluid under pressure into the article while on the form to thereby inflate the article and move a surface portion thereof out of contact with the form into engagement with a single pair of continuously moving frictional surfaces without having said surfaces contact the body area of said form, and moving the friction surfaces away from the form to concomitantly move the article therewith and strip the latter from the form, said single pair of continuously moving frictional surfaces being the only moving frictional surface in contact with said article.

2. A method of removing balloons from the forms on which they are made, which forms comprise a stem forming portion and an enlarged depending portion, said method comprising the steps of inflating the body of the balloon to displace the latter from the form and out of engagement with the enlarged depending portion, and then mechanically frictionally gripping with a single pair of continuously moving frictional surfaces, a lowermost bottom part of the body of the balloon which is out of engagement with said form and thus gripped without gripping said form, and moving the latter away from the form by relative axial movement between the balloon and the form to slide the neck of the balloon away from the stem portion and over said enlarged portion of the form to bodily strip the balloon from the form, said single pair of continuously moving frictional surfaces being the only moving frictional surface in contact with said article.

3. Apparatus for automatically removing balloons from the forms on which they are made, comprising a pair of endless belts rotatable in opposite directions and each having a friction surface, said pair of endless belts having a nip portion, a conveyor mechanism for movably supporting a plurality of forms with balloons thereon in depending relation above said belts and between the latter, said forms traveling between said belts in spaced relation therewith, a plurality of air jets mounted adjacent to said conveyor mechanism and above the neck portion of the balloon to direct air under pressure downwardly into the body of the balloon through the neck portion thereof to inflate the body portion of the balloon into engagement with said belts, and means to rotate the belts in unison to advance therebetween the inflated bottom portion of each of the balloons sequentially thereby removing the balloons from their forms, said belts having the confronting runs thereof converging to the nip of the belts, said runs being initially engageable with a bottom inflated surface of the body of the balloon to move the latter into the nip of said belts.

4. Apparatus according to claim 3 in which said rotating means includes for each said belt a pair of spaced rollers fixed against translation and a third roller transversely adjustably yieldable to the longitudinal axis of the form to vary the biasing pressure at the nip portion between said belts.

5. Apparatus according to claim 3 in which said rotating means includes a first rotatable member fixed against translation and a second rotatable member adjustably yieldable in a direction transversely of the longitudinal axis of said forms to vary the biasing pressure of the nip portion between said belts.

6. Apparatus for automatically stripping articles from the forms on which they are made, comprising a companion pair of friction members having opposite runs converging to a nip portion, said members moving in opposite directions, means supporting a series of forms for travel between said runs with the forms being spaced therefrom, said forms carrying formed articles thereon for stripping therefrom, and fluid pressure means discharging into the articles between the latter and said forms to inflate the same into engagement between said runs, the concomitant movement of said forms and runs advancing the inflated article to said nip portion and therebeyond to strip the same from said form.

7. Apparatus for automatically stripping articles from the forms on which they are made, comprising a companion pair of friction members having opposite runs converging to a nip portion, said members moving in opposite directions, means supporting a series of forms for travel between said runs with the forms being spaced therefrom, said forms carrying formed articles thereon for stripping therefrom, and fluid pressure means discharging into the articles between the latter and said forms to inflate the same into engagement between said runs, the concomitant movement of said forms and runs advancing the inflated article to said nip portion and therebeyond to strip the same from said form, said friction members comprising endless belts having said opposite runs defining an included acute angle therebetween, said belts traveling in a direction axially of said forms with the latter traveling substantially at right angles to said belt direction.

8. Apparatus for automatically stripping articles from the forms on which they are made, comprising a companion pair of friction members having opposite runs converging to a nip portion, said members moving in opposite directions, means supporting a series of forms for travel between said runs with the forms being spaced therefrom, said forms carrying formed articles thereon for stripping therefrom, and fluid pressure means discharging into the articles between the latter and said forms to inflate the same into engagement between said runs, the concomitant movement of said forms and runs advancing the inflated article to said nip portion and therebeyond to strip the same from said form, said friction members being yieldable away from each other at said nip portion to accommodate the articles being stripped from their forms.

9. A method of removing balloons from the forms on which they are made, said forms comprising a stem forming portion and an enlarged depending portion, said method comprising the steps of injecting compressed air into the mouth of the neck of said balloon so as to inflate said balloon and displace the lower portion thereof out of engagement with the enlarged depending portion of said form, continuing the inflation of said balloon so that the resultant inflated balloon is put in gripping engagement only at the bottom portion thereof and with a single pair of continuously moving frictional surfaces without said surfaces gripping the body of said form, and moving said balloon away from said form by imparting relative axial movement between said balloon and said form by means of said moving frictional surfaces so as to slide the neck of the balloon away from the stem portion of said form and over the enlarged portion of said form, thus bodily stripping the balloon from said form.

References Cited in the file of this patent

UNITED STATES PATENTS

| | | |
|---|---|---|
| 1,330,595 | Lerch | Feb. 10, 1920 |
| 2,116,916 | Van Hyning | May 10, 1938 |
| 2,221,711 | Kurkjian | Nov. 12, 1940 |
| 3,007,195 | Gammeter | Nov. 7, 1961 |

FOREIGN PATENTS

| | | |
|---|---|---|
| 1,087,345 | Germany | Aug. 18, 1960 |
| 668,382 | Great Britain | Mar. 19, 1952 |
| 846,974 | Great Britain | Sept. 7, 1960 |